United States Patent
Hashisho

(10) Patent No.: US 10,687,165 B2
(45) Date of Patent: Jun. 16, 2020

(54) POSITIONING SYSTEM AND METHOD UTILIZING NORMALIZED BEACON SIGNAL STRENGTHS

(71) Applicant: HERE Global B.V., Eindhoven (NL)

(72) Inventor: Basel Hashisho, Berlin (DE)

(73) Assignee: HERE Global B.V., Eindhoven (NL)

( * ) Notice: Subject to any disclaimer, the term of this patent is extended or adjusted under 35 U.S.C. 154(b) by 77 days.

(21) Appl. No.: 16/028,044

(22) Filed: Jul. 5, 2018

(65) Prior Publication Data
US 2020/0015030 A1    Jan. 9, 2020

(51) Int. Cl.
*H04W 4/02* (2018.01)
*G01S 3/28* (2006.01)

(52) U.S. Cl.
CPC ............... *H04W 4/02* (2013.01); *G01S 3/28* (2013.01)

(58) Field of Classification Search
None
See application file for complete search history.

(56) References Cited

U.S. PATENT DOCUMENTS

| | | | | |
|---|---|---|---|---|
| 3,987,446 | A * | 10/1976 | Lipsky | G01S 3/20 342/429 |
| 5,548,807 | A * | 8/1996 | Ueda | H04W 16/10 370/334 |
| 9,814,051 | B1 | 11/2017 | Shpak | |
| 2004/0203539 | A1 * | 10/2004 | Benes | H04W 64/00 455/101 |
| 2005/0032531 | A1 * | 2/2005 | Gong | G01S 3/28 455/456.5 |
| 2007/0173303 | A1 * | 7/2007 | Viorel | H01Q 1/246 455/575.7 |
| 2011/0263207 | A1 * | 10/2011 | Tijink | G07B 15/063 455/66.1 |

(Continued)

FOREIGN PATENT DOCUMENTS

EP    3232696 A1    10/2017

OTHER PUBLICATIONS

Gunhardson, E., *Indoor Positioning Using Angle of Departure Information*, (Research Paper) Department of Science and Technology, Linköping University (Oct. 1, 2015) 72 pages.

(Continued)

*Primary Examiner* — German Viana Di Prisco
(74) *Attorney, Agent, or Firm* — Alston & Bird LLP

(57) ABSTRACT

A positioning system, method and computer program product determine a position of a mobile device, such as in instances in which the mobile device is indoors. In regards to a positioning system, the positioning system is caused to determine a signal strength of signals received from at least first and second directive antennas of a beacon and at least a non-directive antenna of the beacon. The positioning system is also caused to normalize the signal strength of the signals received from the first and second directive antennas based on the signal strength of the signals received from the non-directive antenna in order to determine normalized signal strengths of the signals received from the first and second directive antennas. The positioning system is further caused to determine an angle at which the signals from the beacon propagate based upon the normalized signals strengths.

24 Claims, 12 Drawing Sheets

(56) References Cited

U.S. PATENT DOCUMENTS

| | | | |
|---|---|---|---|
| 2012/0086608 A1* | 4/2012 | Cathelin | H01Q 3/24 |
| | | | 343/702 |
| 2015/0133173 A1 | 5/2015 | Edge et al. | |
| 2015/0204649 A1 | 7/2015 | McFarthing et al. | |
| 2015/0215011 A1* | 7/2015 | Hartenstein | H04B 7/02 |
| | | | 375/267 |
| 2015/0271641 A1* | 9/2015 | Sung | G01S 5/02 |
| | | | 455/456.6 |
| 2016/0047885 A1 | 2/2016 | Wang et al. | |
| 2016/0255471 A1* | 9/2016 | Marri Sridhar | H04B 17/318 |
| | | | 455/456.2 |
| 2016/0295376 A1* | 10/2016 | Geng | H04W 4/043 |
| 2017/0026794 A1 | 1/2017 | Baker et al. | |
| 2017/0079001 A1* | 3/2017 | Lewis | H04W 64/00 |
| 2017/0118774 A1* | 4/2017 | Cariou | H04W 74/0816 |
| 2017/0212204 A1 | 7/2017 | Amizur et al. | |
| 2018/0006688 A1* | 1/2018 | Cariou | H04B 7/0452 |
| 2018/0038937 A1 | 2/2018 | Afzal | |
| 2020/0011958 A1* | 1/2020 | Hashisho | G01S 5/0063 |

OTHER PUBLICATIONS

Office Action for U.S. Appl. No. 16/028,090 dated Apr. 28, 2020.

* cited by examiner

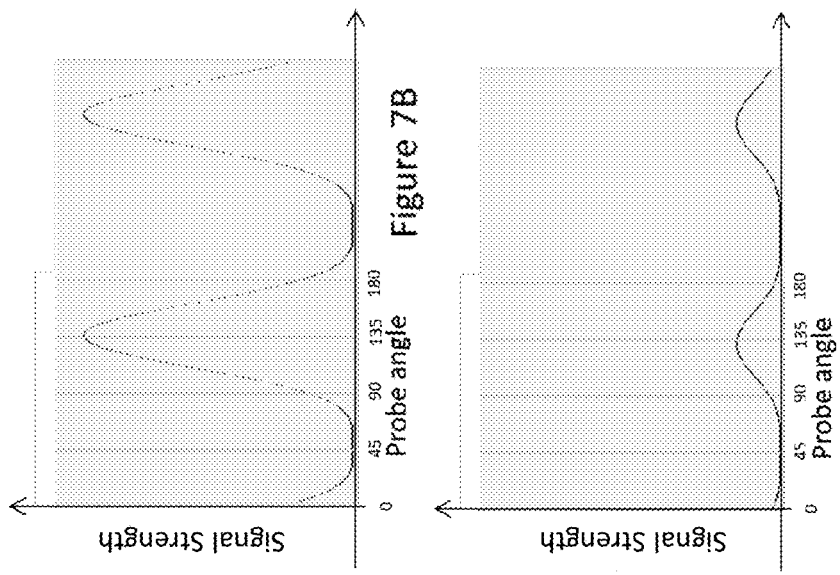
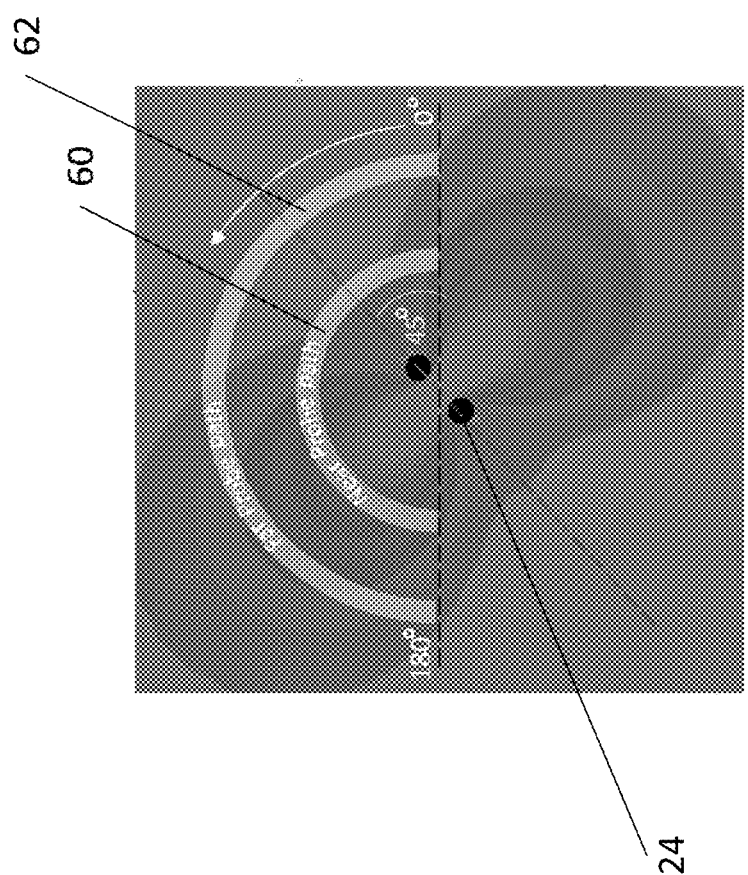

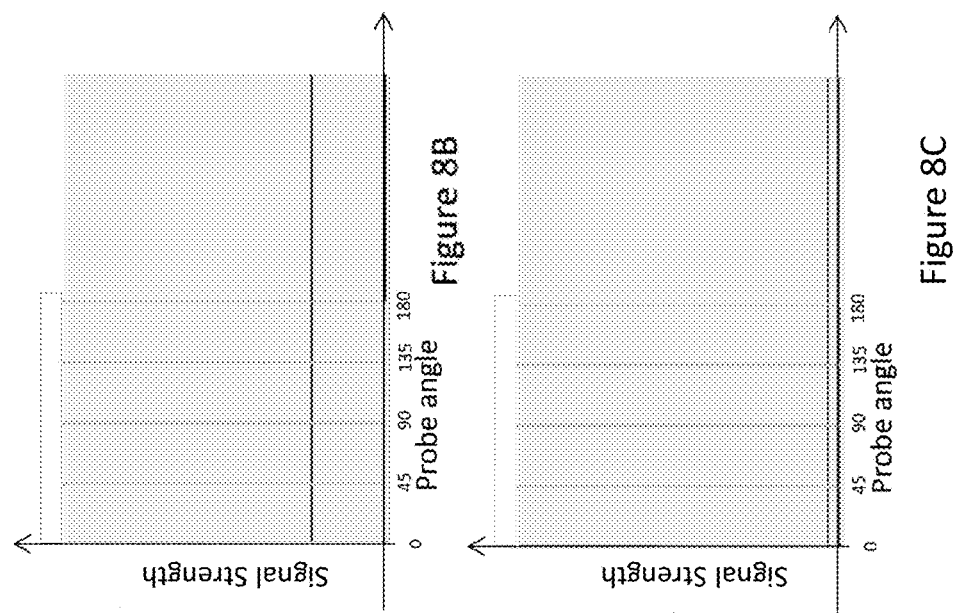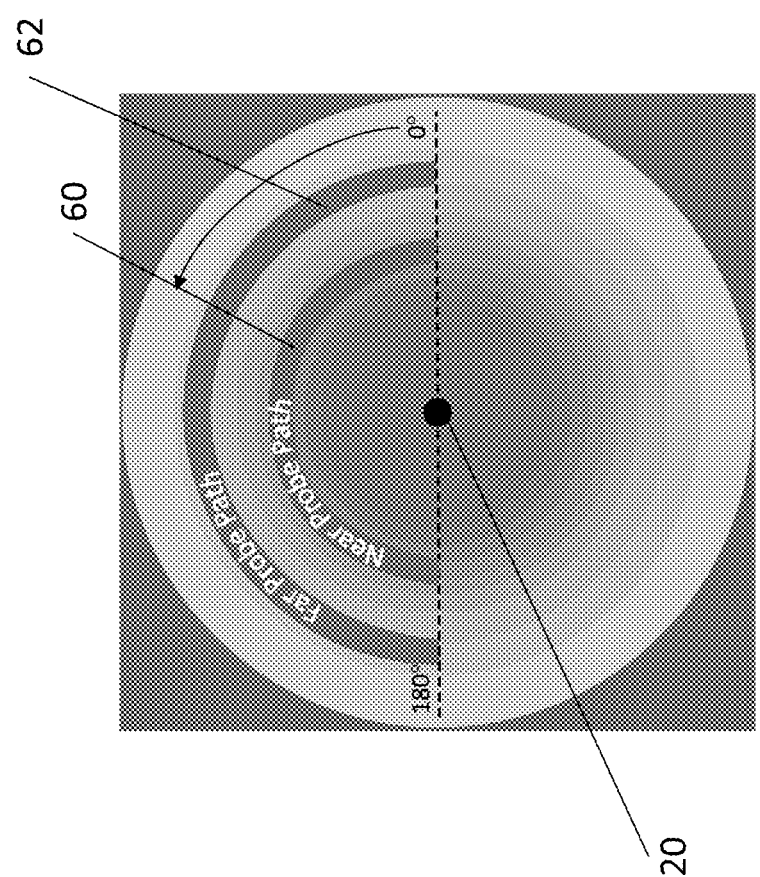

POSITIONING SYSTEM AND METHOD UTILIZING NORMALIZED BEACON SIGNAL STRENGTHS

TECHNOLOGICAL FIELD

An example embodiment relates generally to a positioning system, method and computer program product for determining a position of a mobile device and, more particularly, to a positioning system, method and computer program product for determining an angle of the mobile device with respect to a beacon.

BACKGROUND

The position of a mobile device is useful for a variety of applications including navigation, routing and mapping applications. While the location of mobile devices that are outside can be determined utilizing a Global Positioning System (GPS) or other conventional techniques, the location of a mobile device that is indoors must sometimes be determined in a different manner. For example, mobile devices that are in large buildings or buildings that are constructed or otherwise secured in a manner that limits cellular communication by the mobile device may not be located or at least may not be located in an accurate manner by GPS or other conventional techniques. As such, a number of techniques have been developed in order to determine the position of mobile devices in an instance in which the mobile devices are indoors. These indoor positioning techniques do not rely upon cellular communication and, instead, generally utilize various other wireless network technologies.

For example, mobile devices may be configured to wirelessly broadcast identification information to receiving units, such as scanners, located at predefined positions. The receiving units, such as the scanners, include smart antennas, such as phased array antennas or multiple directive receiving antennas, for determining the angle of arrival of the signals broadcast by the mobile devices in order to identify the position of the mobile devices. Alternatively, the indoor position of a mobile device may also be determined utilizing a radio frequency (RF) fingerprint technique or a received signal strength (RSS) scene analysis. These localization techniques estimate the position of the mobile device by matching radio signals, e.g. fingerprints, provided by other devices or objects in proximity to the mobile device to a radio map. In order to support these localization techniques, radio mapping is initially performed prior to utilizing the resulting radio map for positioning of the mobile device. During the radio mapping, the position coordinates and RSS of radio signals, e.g., fingerprints, provided by devices and objects are gathered. In order to determine the position of the mobile device, the radio signals received by the mobile device are compared to the fingerprints that were identified during construction of the radio map and the position the mobile device is estimated based upon the closest match therebetween.

The indoor positioning of a mobile device may also be determined by triangulation. One example of triangulation is angulation, also known as angle of arrival or direction of arrival. An angulation technique estimates the location of a mobile device based upon the angle of the mobile device to various reference points. Another technique for determining the indoor position of a mobile device utilizes time of arrival. In this regard, the distance between two devices is measured utilizing the one-way propagation time for signals transmitted between the devices which, in turn, is dependent upon a predefined signal propagation speed. Alternatively, the indoor position of a mobile device may be determined by utilizing proximity that provides symbolic relative localization information. For example, if a mobile device is detected by a single reference unit, the location of the mobile device is associated with a location of the single reference unit. However, in an instance in which a mobile device is detected by multiple reference units, the location of the mobile device may be related to the position of the reference unit that communicates with a mobile device with the strongest signal.

BRIEF SUMMARY

A positioning system, method and computer program product are provided in accordance with an example embodiment in order to determine a position of a mobile device, such as in instances in which the mobile device is indoors. The positioning system, method and computer program product of an example embodiment utilize signals transmitted by beacons in order to determine the position of a mobile device, thereby limiting the communication infrastructure that is required and permitting extended operation as a result of limited power consumed by the one or more beacons. The positioning system, method and computer program product of an example embodiment are also configured to be immune to signal attenuation attributable to the distance between the mobile device and the one or more beacons and/or to objects through which the signals must pass between the one or beacons and the mobile device. As such, the positioning system, method and computer program product of an example embodiment are configured to determine the position of the mobile device in an accurate and stable manner.

In an example embodiment, a positioning system is provided that includes processing circuitry and at least one memory including computer program code with the at least one memory and the computer program code configured to, with the processing circuitry, cause the positioning system to determine a signal strength of signals received from at least first and second directive antennas of a beacon and at least a non-directive antenna of the beacon. The at least one memory and the computer program code are also configured to, with the processing circuitry, cause the positioning system to normalize the signal strength of the signals received from the first and second directive antennas based on the signal strength of the signals received from the non-directive antenna in order to determine normalized signal strengths of the signals received from the first and second directive antennas. The at least one memory and the computer program code are further configured to, with the processing circuitry, cause the positioning system to determine an angle at which the signals from the beacon propagate based upon the normalized signals strengths.

The at least one memory and the computer program code are configured to, with the processing circuitry, cause the positioning system of an example embodiment to normalize the signal strengths of the signals received from the first and second directive antennas by determining a ratio of the signal strength of the signals received from the first directive antenna to the signal strength of the signals received from the non-directive antenna to determine the normalize signal strength of the signals received from the first directive antenna. Similarly, the at least one memory and the computer program code are configured to, with the processing circuitry, cause the positioning system of this example embodiment to normalize the signal strengths of the signals received from the first and second directive antennas by determining a ratio of the signal strength of the signals received from the second directive antenna to the signal strength of the signals received from the non-directive antenna to determine the normalized signal strength of the signals received from the second directive antenna.

The at least one memory and the computer program code are further configured to, with the processing circuitry, cause the positioning system of an example embodiment to identify whether the signals are received from the first directive antenna, the second directive antenna or the non-directive antenna based upon an antenna identifier associated with the signals. The at least one memory and the computer program code are configured to, with the processing circuitry, cause the positioning system to determine the angle by determining the angle from a parametric model representative of relationships based upon the normalized signal strengths of the signals received from the first and second directive antennas to the angle.

The positioning system of an example embodiment also includes a communication interface configured to sequentially receive signals transmitted from the beacon by the first directive antenna, signals transmitted from the beacon by the second directive antenna and signals transmitted from the beacon by the non-directive antenna. In this example embodiment, the communication interface may be configured to receive a different address associated with the each of the signals transmitted from the beacon by the first directive antenna, the signals transmitted from beacon by the second directive antenna and the signals transmitted from the beacon by the non-directive antenna. The communication interface maybe embodied by a mobile device and the at least one memory and the computer program code may be further configured to, with the processing circuitry, cause the positioning system of the example embodiment to determine a position of the mobile device by determining an angle at which signals from another beacon propagate and determining the position of the mobile device based upon an intersection of references lines extending from the beacons at the respective angles.

In another example embodiment, a method is provided that includes determining a signal strength of signals received from at least first and second directive antennas of a beacon and at least a non-directive antenna of the beacon. The method also includes normalizing the signal strengths of the signals received from the first and second directive antennas based on the signal strength of the signals received from the non-directive antenna to determine normalized signal strengths of the signals received from the first and second directive antennas. The method further includes determining an angle at which the signals from the beacon propagate based upon the normalized signals strengths.

The method of an example embodiment normalizes the signal strengths of the signals received from the first and second directive antennas by determining a ratio of the signal strength of the signals received from the first directive antenna to the signal strength of the signals received from the non-directive antenna to determine the normalized signal strength of the signals received from the first directive antenna. The method of this example embodiment also normalizes the signal strengths of the signals received from the first and second directive antennas by determining a ratio of the signal strength of the signals received from the second directive antenna to the signal strength of the signals received from the non-directive antenna to determine the normalized signal strength of the signals received from the second directive antenna.

The method of an example embodiment also includes identifying whether the signals are received from the first directive antenna, the second directive, or the non-directive antenna based upon an antenna identifier associated with the signals. In an example embodiment, the method determines the angle by determining the angle from a parametric model representative of relationships based upon the normalized signal strengths of the signals received from the first and second directive antennas to the angle. The method of an example embodiment also includes sequentially receiving signals transmitted from the beacon by the first directive antenna, signals transmitted from the beacon by the second directive antenna and signals transmitted from the beacon by the non-directive antenna. The method of this example embodiment may also include receiving a different address associated with the each of the signals transmitted from the beacon by the first directive antenna, the signals transmitted from the beacon by the second directive antenna and the signals transmitted from the beacon by the non-directive antenna. In this example embodiment in which the signals are received by a mobile device, the method may also include determining a position of the mobile device by determining the angle at which signals from another beacon propagate and determining the position the mobile device based upon an intersection of reference lines extending from the beacons at the their respective angles.

In a further example embodiment, a computer program product is provided that includes at least one non-transitory computer-readable storage medium having computer-executable program code portions stored therein with the computer-executable program code portions including program code instructions configured to determine a signal strength of signals received from at least first and second directive antennas of a beacon and at least a non-directive antenna of the beacon. The computer-executable program code portions also include program code instructions configured to normalize the signal strengths of signals received from the first and second directive antennas based on the signal strength of the signals received from the non-directive antenna to determine normalized signal strengths of the signals received from the first and second directive antennas. The computer-executable program code portions further include program code instructions configured to determine an angle at which the signals from the beacon propagate based upon the normalized signals strengths.

In an example embodiment, the program code instructions configured to normalize the signal strengths of the signals received from the first and second directive antennas include program code instructions configured to determine a ratio of the signal strength of the signals received from the first directive antenna to the signal strength of the signals received from the non-directive antenna to determine the normalized signal strength from the first directive antenna. In this example embodiment, the program code instructions configured to normalize the signal strengths of the signals received from the first and second directive antennas also include program code instructions configured to determine a ratio of the signal strength of the signals received from the second directive antenna to the signal strength of the signals received from the non-directive antenna to determine the normalized signal strength of the signals received from the second directive antenna.

The computer-executable program code portions of an example embodiment also include program code instructions configured to identify whether the signals are received from the first directive antenna, the second directive antenna or the non-directive antenna based upon an antenna identifier associated with the signals. In an example embodiment, the program code instructions configured to determine the angle include program code instructions configured to determine the angle from a parametric model representative of relationships based upon the normalized signal strengths of the signals received from the first and second directives antennas to the angle.

In an example embodiment, the computer-executable program code portions also include program code instructions configured to cause signals transmitted from the beacon by the first directive antenna, signals transmitted from the beacon by the second directive antenna and signals transmitted from the beacon by the non-directive antenna to be stored in different memory locations based upon a different address associated with each of the signals transmitted from the beacon by first directive antenna, the signals transmitted from the beacon by the second directive antenna, and the signals transmitted from the beacon by the non-directive antenna. In this example embodiment in which the signals are received by a mobile device, the computer-executable program code portions may also include program code instructions configured to determine a position of the mobile device by determining an angle at which signals from another beacon propagate and determining the position of the mobile device based upon an intersection of reference lines extending from the beacons at the respective angles.

BRIEF DESCRIPTION OF THE DRAWINGS

Figure 1:
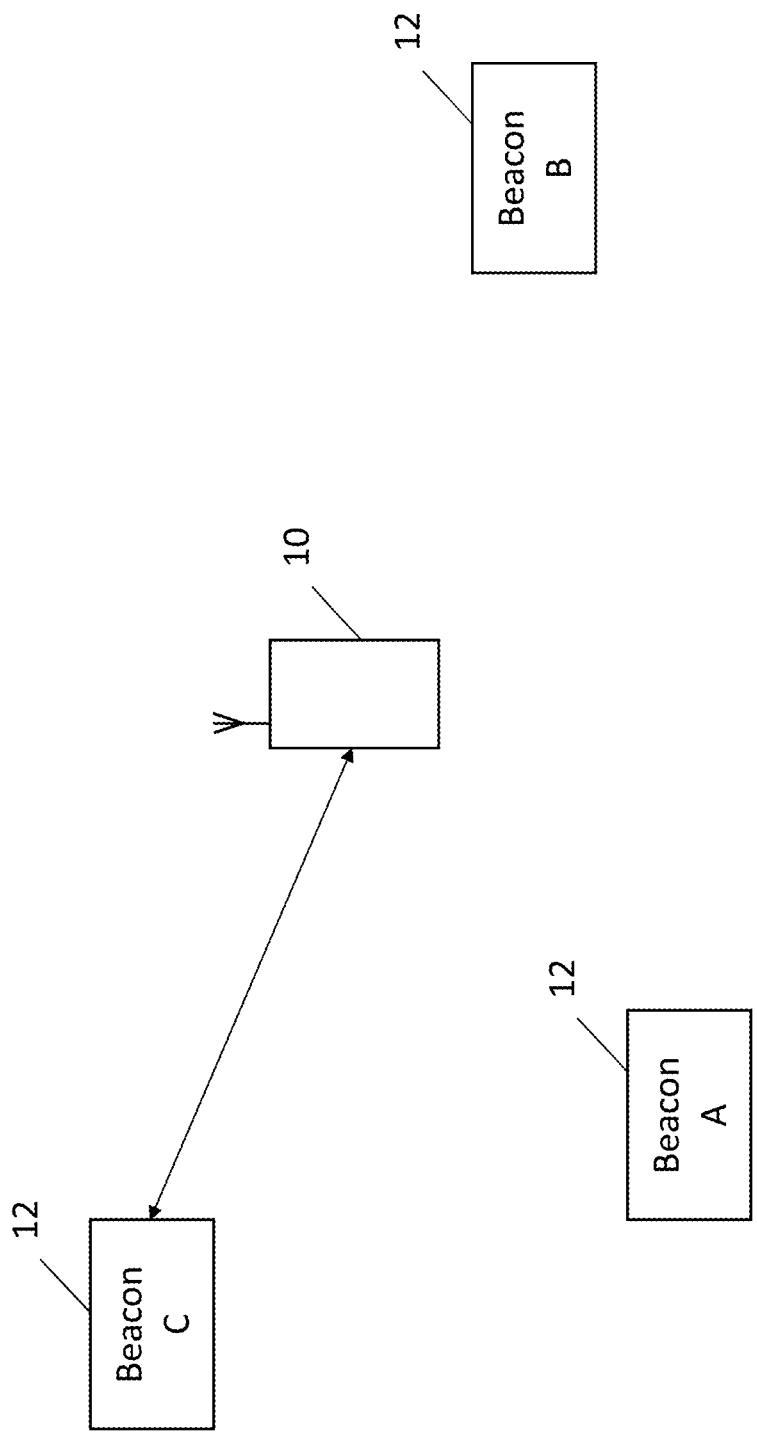
Figure 2:
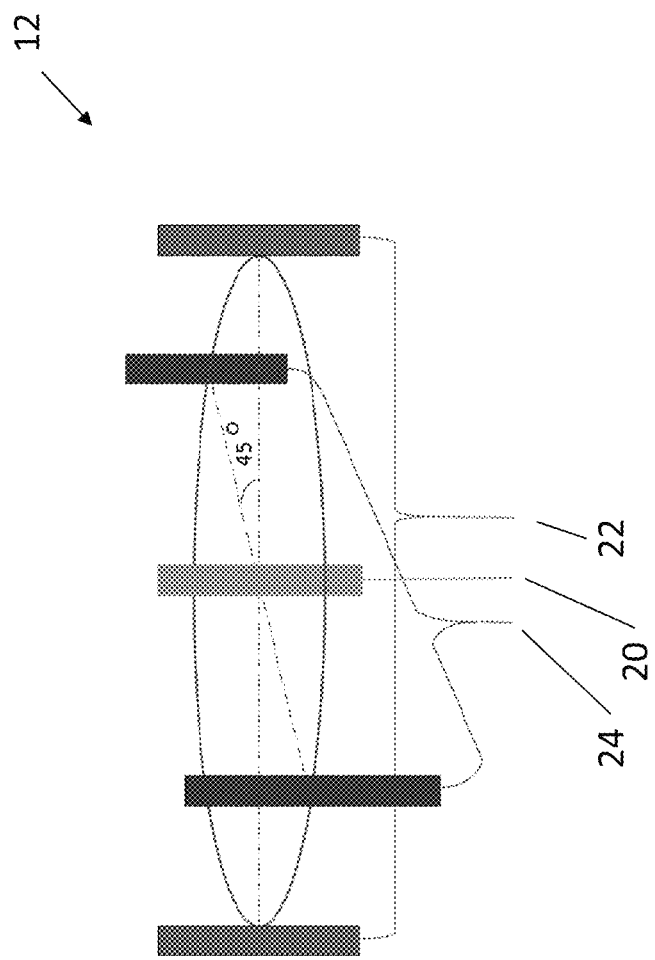
Figure 3A:
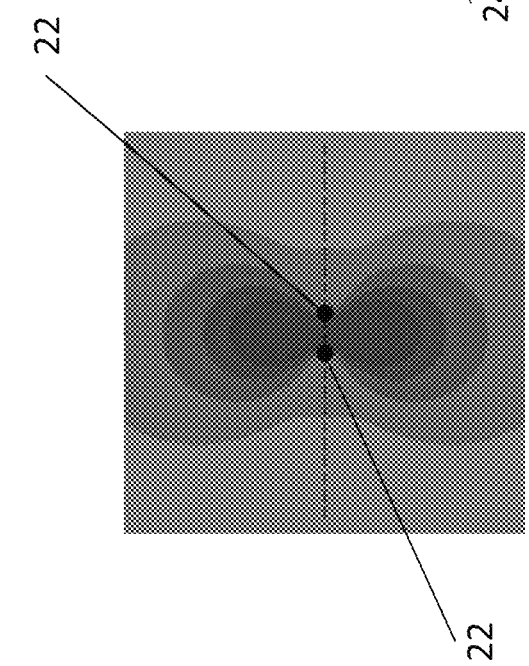
Figure 3B:
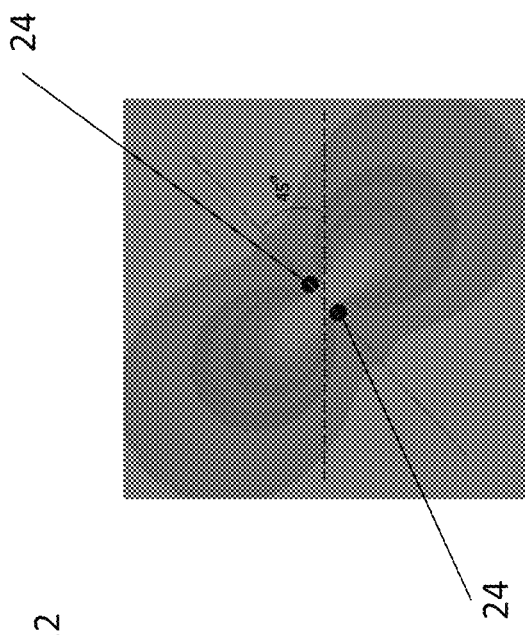
Figure 3C:
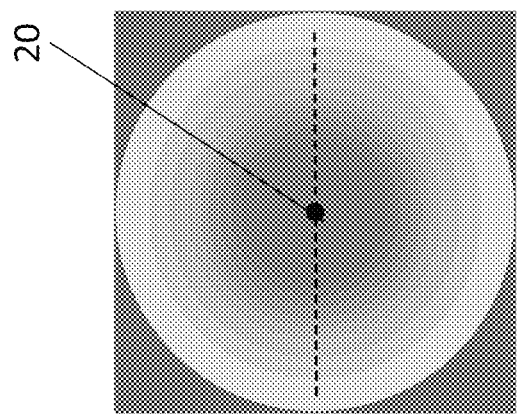
Figure 4:
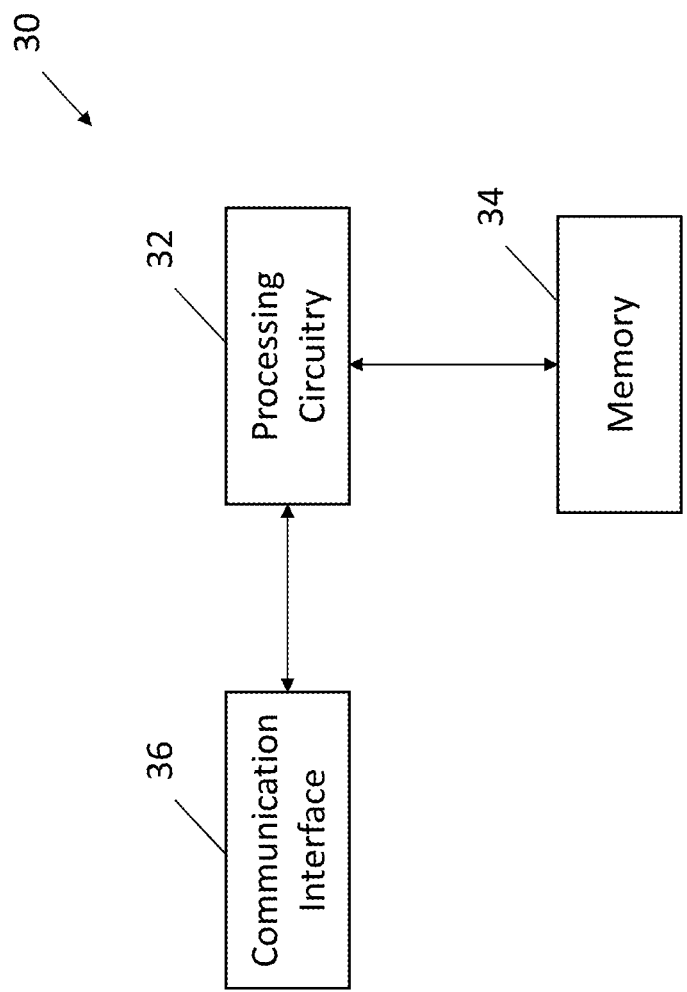
Figure 5:
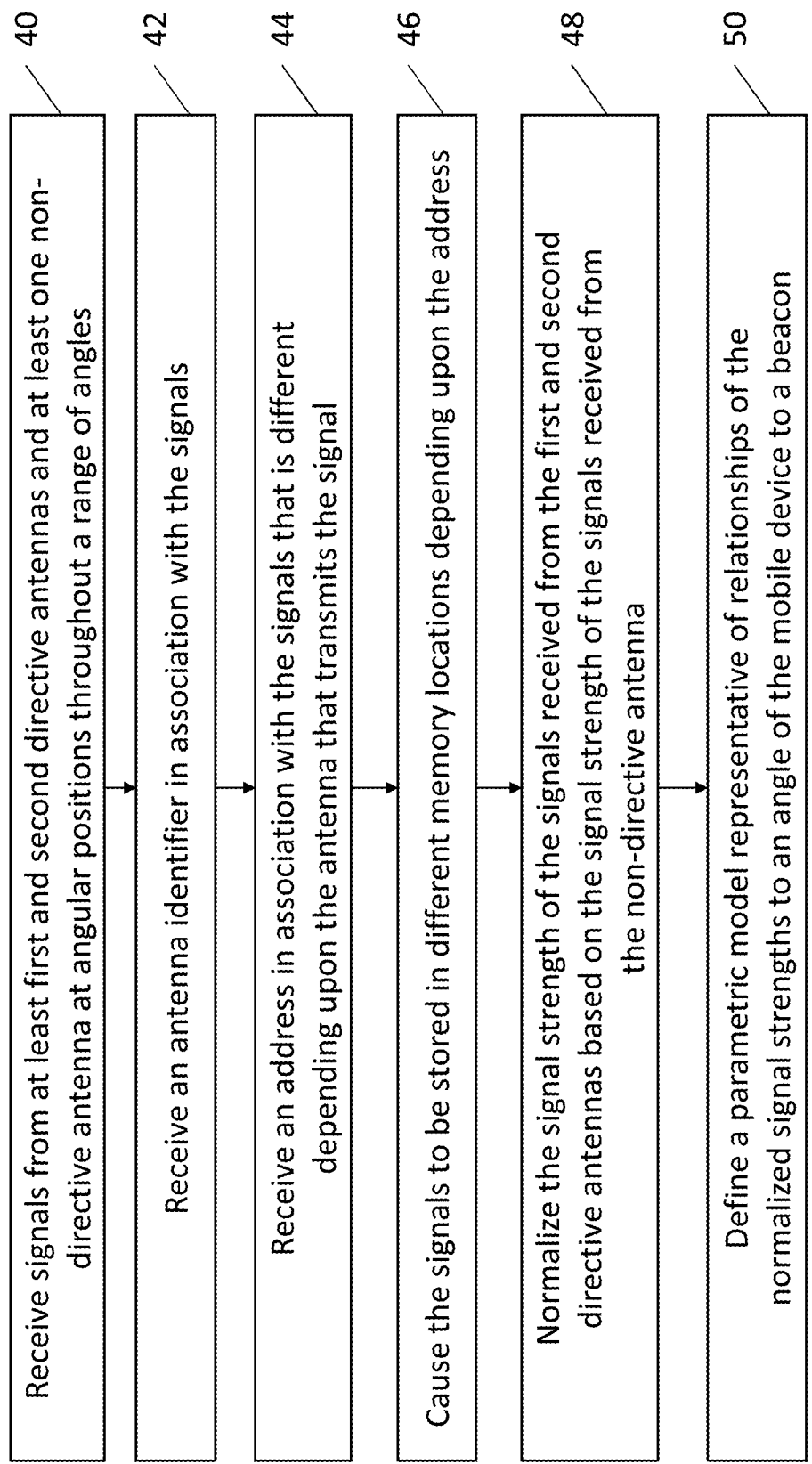
Figure 6B:
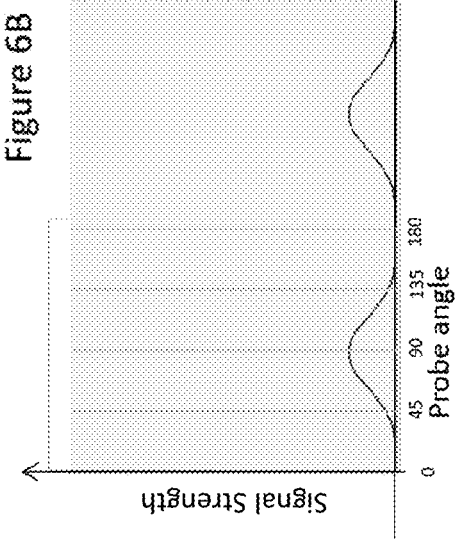
Figure 6A:
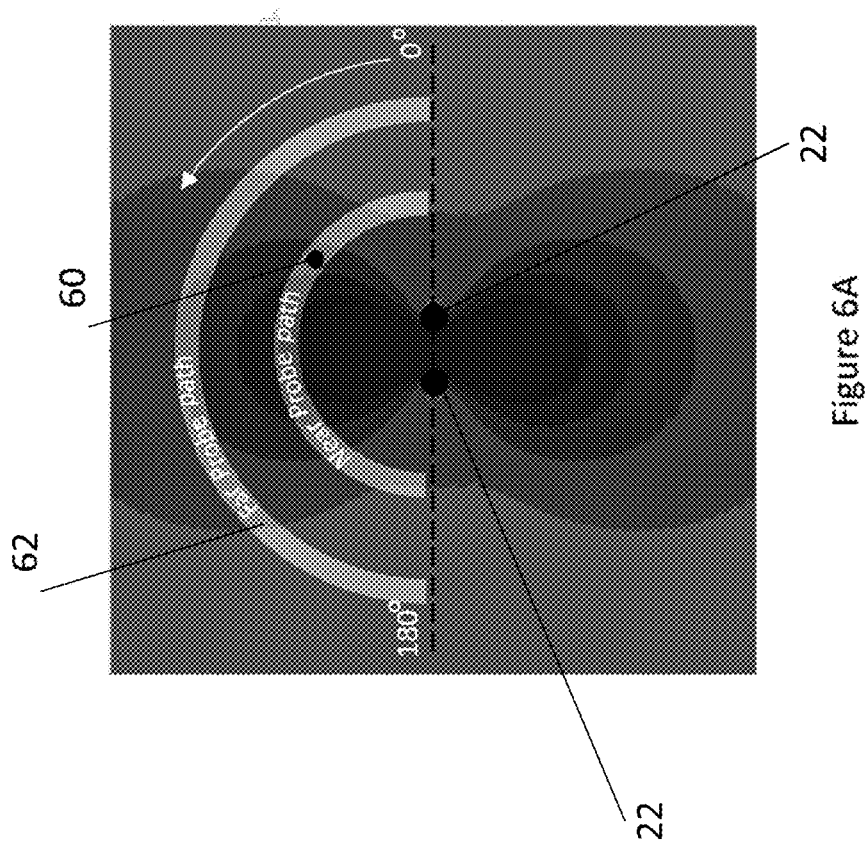
Figure 6C:
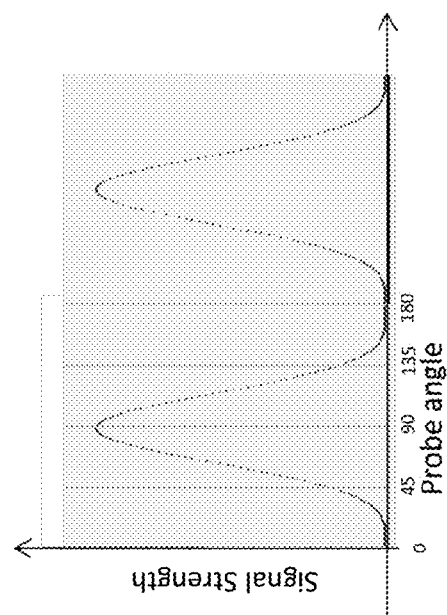
Figure 9A:
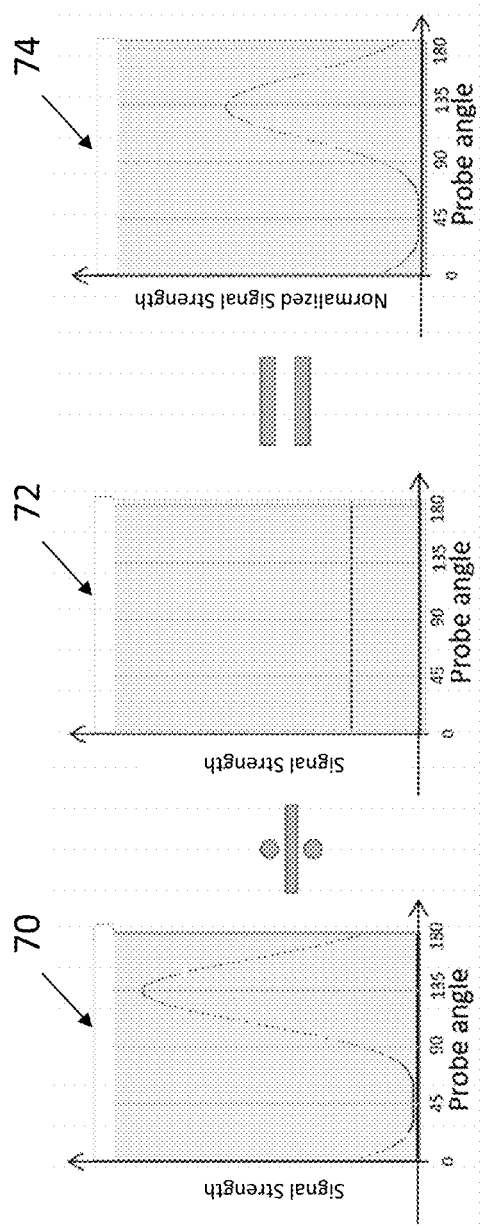
Figure 9B:
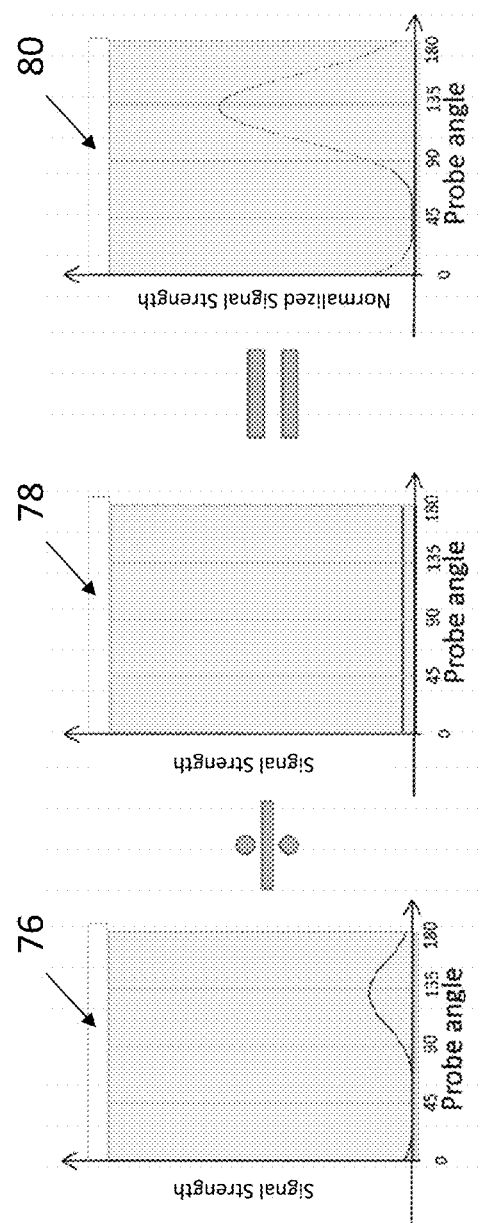
Figures 10A, 10B, 10C:
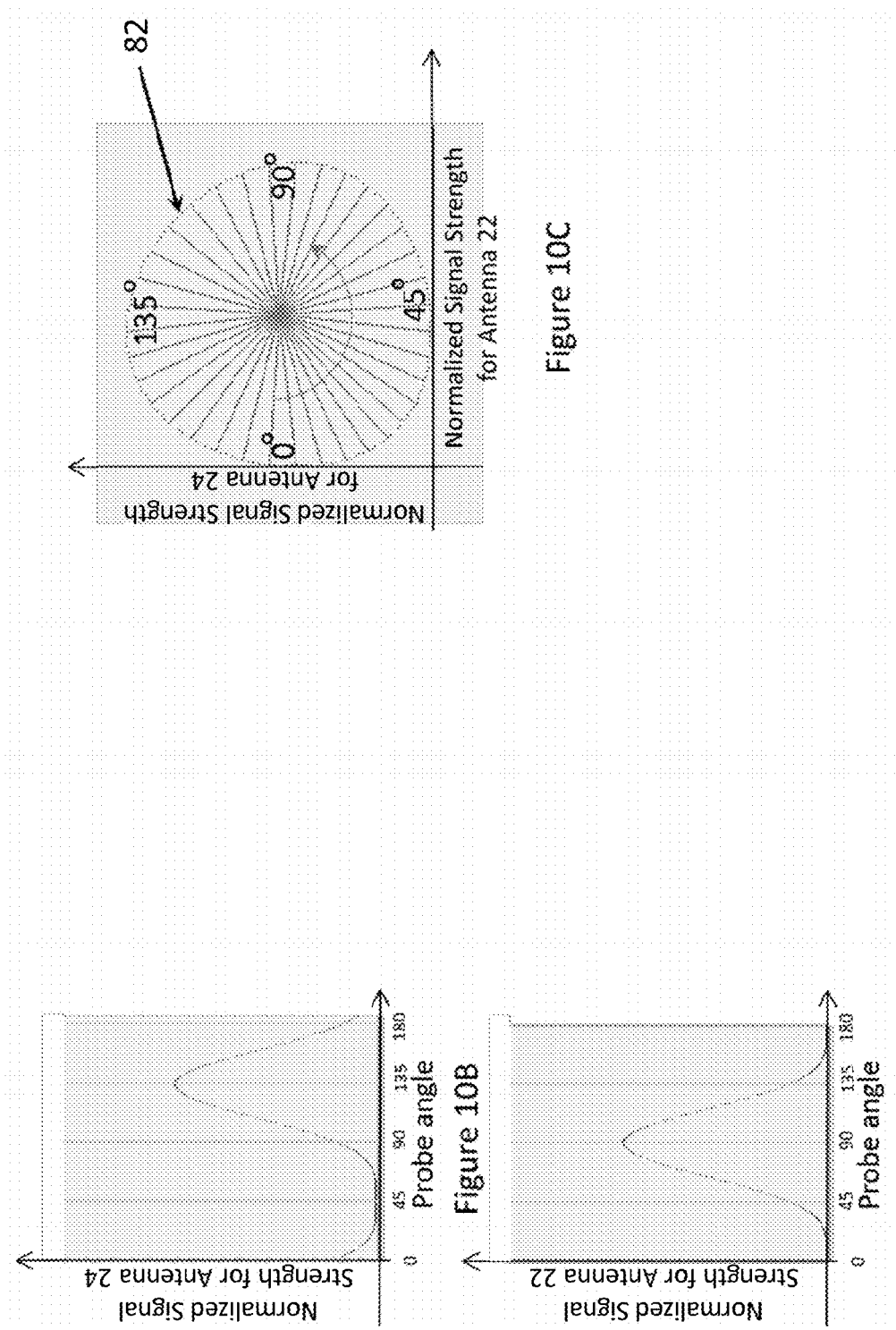
Figure 11:
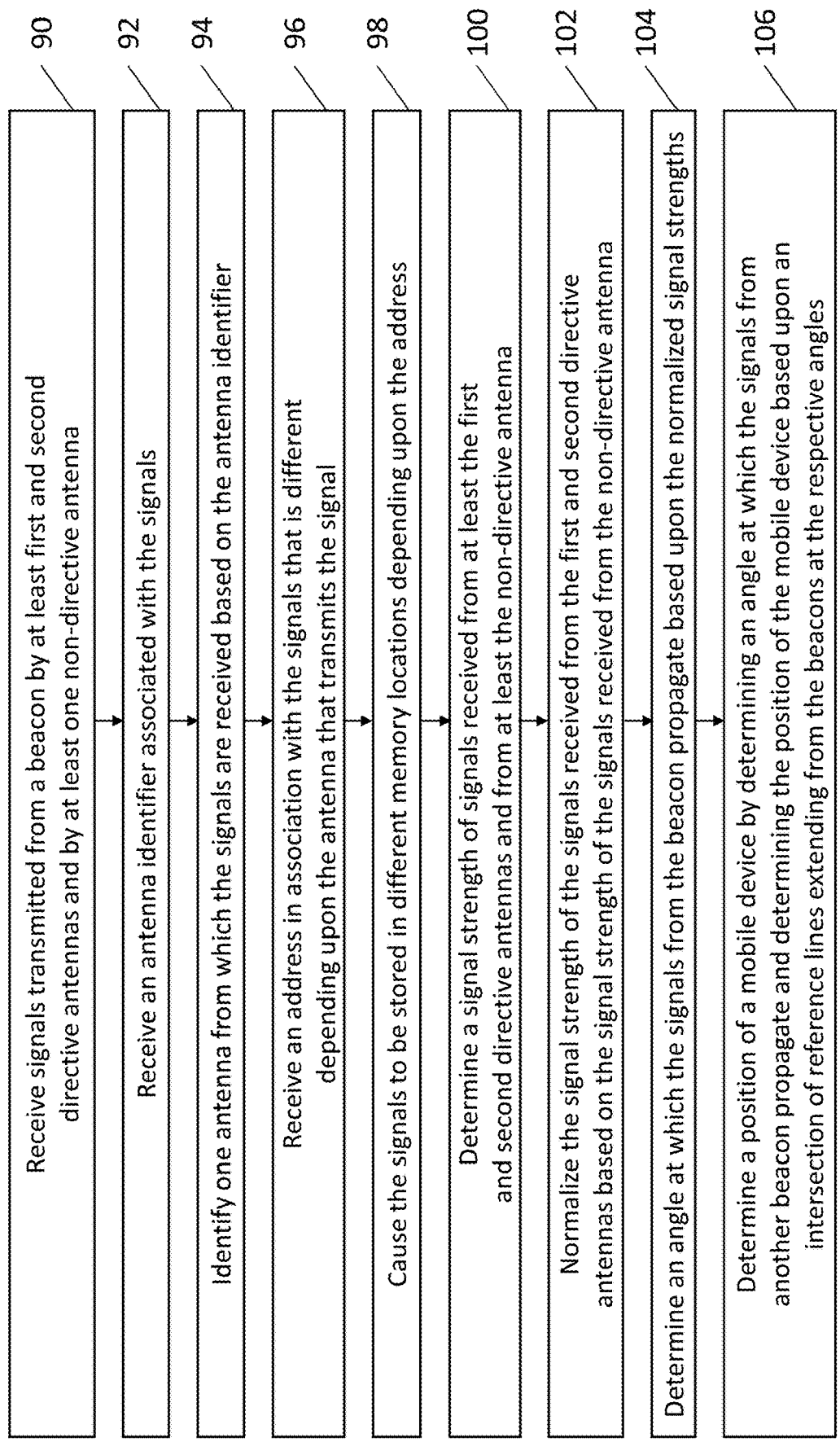
Figure 12:
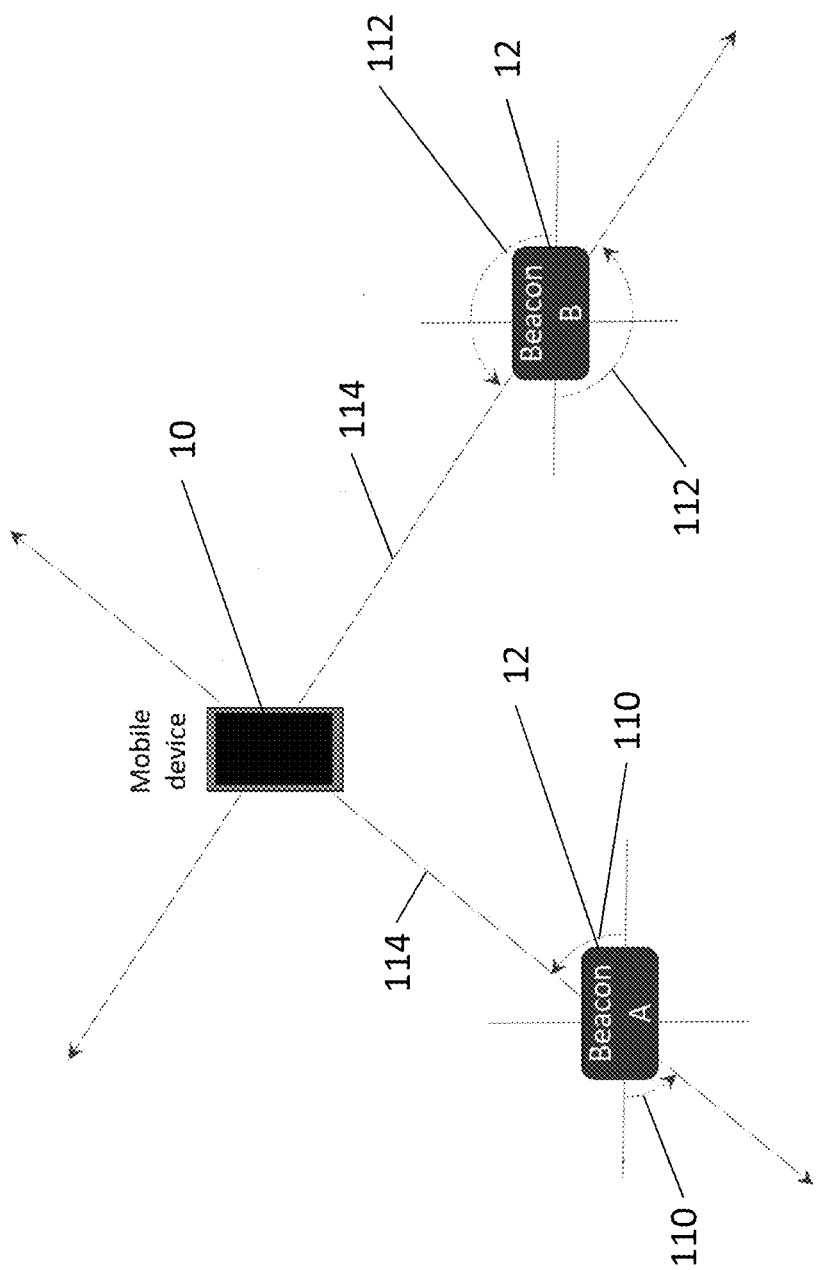

Having thus described example embodiments of the present disclosure in general terms, reference will now be made to the accompanying drawings, which are not necessarily drawn to scale, and wherein:

FIG. 1 illustrates a mobile device configured to wirelessly communicate with a plurality of beacons;

FIG. 2 illustrates a beacon having first and second directive antennas and a non-directive antenna in accordance with an example embodiment of the present disclosure;

FIGS. 3A, 3B and 3C are radiation patterns defined by the first directive antenna, the second directive antenna and the non-directive antenna, respectively, in accordance with an example embodiment of the present disclosure;

FIG. 4 is a block diagram of an apparatus that may be specifically configured in accordance with an example embodiment of the present disclosure;

FIG. 5 is a flow chart illustrating operations performed, such as by the apparatus of FIG. 4, in accordance with an example embodiment of the present disclosure;

FIG. 6A illustrates near and far probe paths relative to the radiation pattern defined by the first directive antenna;

FIGS. 6B and 6C graphically represent the signal strength of the signals transmitted by the first directive antenna as a function of angle along the near probe path and the far probe path, respectively;

FIG. 7A illustrates near and far probe paths relative to the radiation pattern defined by the second directive antenna;

FIGS. 7B and 7C graphically represent the signal strength of the signals transmitted by the second directive antenna as a function of angle along the near probe path and the far probe path, respectively;

FIG. 8A illustrates near and far probe paths relative to the radiation pattern defined by the non-directive antenna;

FIGS. 8B and 8C graphically represent the signal strength of the signals transmitted by the non-directive antenna as a function of angle along the near probe path and the far probe path, respectively;

FIG. 9A graphically represents the determination of the normalized signal strength of the signals received from the second directive antenna as a function of angle in accordance with an example embodiment of the present disclosure;

FIG. 9B graphically represents the determination of the normalized signal strength of the signals received from the second directive antenna as a function of angle in accordance with an example embodiment of the present disclosure;

FIGS. 10A and 10B graphically represent the normalized signal strengths as a function of angle for the signals received from the first and second directive antennas, respectively, in accordance with an example embodiment of the present disclosure;

FIG. 10C is a graphical representation of a parametric model based upon the normalized signal strengths for signals received from the first and second directive antennas as shown in FIGS. 10A and 10B, respectively, in accordance with an example embodiment of the present disclosure;

FIG. 11 is a flow chart illustrating operations performed, such as by the apparatus of FIG. 4, in accordance with an example embodiment of the present disclosure; and FIG. 12 illustrates the position of a mobile device along reference lines defined from beacons A and B in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In accordance with an example embodiment, a system and method are provided for defining a parametric model of an angle of a mobile device to a beacon. Based upon the parametric model, the position of the mobile device may be determined, at least in terms of the angle of the mobile device respect to the beacon and, in some embodiments, in terms of the location of the mobile device, either relative to the beacon or in more absolute terms. Thus, a positioning system, method and computer program product are provided in accordance with other example embodiments in order to determine the position of the mobile device. While the position of the mobile device may be determined in various settings, the positioning system, method and computer program product of an example embodiment are configured to determine the position of the mobile device in instances in which the mobile device is indoors and to do so in an accurate and stable manner.

With reference to FIG. 1, a mobile device 10 may be in communication, such as wireless communication, with one or more beacons 12. Although the mobile device and the beacon(s) can wirelessly communicate in accordance with a variety of wireless communications techniques, such as Wi-Fi, the mobile device and beacon(s) of an example embodiment are configured to communication in accordance with Bluetooth wireless communications. In the embodiment depicted in FIG. 1, the mobile device is in wireless communication with three beacons, namely, Beacon A, Beacon B and Beacon C. However, the mobile device may be in communication with any number of beacons. In some embodiments, the mobile device and the one or more beacons are located indoors, such as in a building. However, the mobile device and the one or more beacons may be located in other settings, including outdoor settings, in other embodiments. Regardless of the setting, the locations of the beacon(s) are predefined.

In accordance with an example embodiment, each beacon 12 includes at least two directive antennas, such as at least first and second directive antennas, as well as at least one non-directive antenna. In an example embodiment, the directive antennas and the non-directive antenna are disposed in a cylindrical-centric orientation. By way of example, FIG. 2 depicts the antennas of a beacon arranged in a cylindrical-centric orientation with the non-directive antenna 20 disposed along a central axis and first and second directive antennas 22, 24 disposed on a cylindrical reference surface centered about the central axis. The first and second directive antennas may be angularly offset from one another about the cylindrical reference surface by a predefined angle, such as 45 degrees in the illustrated embodiment. However, the first and second directive antennas may be angularly offset by other predefined angles in other example embodiments. The beacon may include additional directive antennas, such as three or more directive antennas, with each directive antenna being angularly offset from the other directive antennas by a predefined angle. In these other embodiments in which the beacon includes three or more directive antennas, the predefined angular offset may be the same or may be different for each directive antenna.

A directive antenna is configured to generate a radiation pattern that has an angular dependency in that the radiation pattern varies depending upon the angle of departure of the signals from the directive antenna. Conversely, a non-directive antenna generates a uniform radiation pattern for all angles of departure of the signals from the non-directive antenna. A beacon 12 may include a variety of different types of directive antennas and a variety of different types of non-directive antennas. In an example embodiment depicted in FIG. 2, however, the non-directive antenna 20 is a dipole antenna disposed along the central axis. In this example embodiment, the first and second directive antennas 22, 24 are two element array antennas. Each two element array antenna includes first and second elements. The first and second elements of each two element array antenna may, in the illustrated embodiment, be oppositely positioned on the cylindrical reference surface as to be spaced apart by 180 degrees.

Although the radiation patterns emitted by the directive antennas may vary depending upon the type of directive antenna, the radiation patterns emitted by first and second directive antennas 22, 24 in the form of two element array antennas as shown in FIG. 2 are depicted in FIGS. 3A and 3B, respectively. With respect to the radiation pattern emitted by the first directive antenna as shown in FIG. 3A, the first and second elements of the two element array antenna that form the first directive antenna of this example embodiment are depicted and the symmetrical radiation patterns that extend outwardly in opposite directions from the axis extending through the first and second elements are also depicted. The strength of the signals emitted by the first directive antenna is represented by the relative darkness of the radiation pattern of FIG. 3A with darker portions representative of stronger signals and lighter portions representative of weaker signals. As shown, the strength of the signals emitted by the first directive antenna diminishes as the distance from the first directive antenna increases.

Similarly, the radiation pattern emitted by the second directive antenna 24 is depicted in FIG. 3B with the signals that are emitted by the second directive antenna extending outward in a symmetrical manner and in opposite directions from an axis that extends between the first and second elements of the two element array antenna of the second directive antenna. Since the second directive antenna is angularly offset, such as by 45 degrees in this example embodiment, from the first directive antenna 22, the radiation pattern of the second directive antenna is correspondingly offset by the same predefined angle relative to the radiation pattern of the first directive antenna. Like the radiation pattern of the first directive antenna, however, the radiation pattern emitted by the second directive antenna also has a signal strength that diminishes as the distance from the second directive antenna increases.

In contrast to the radiation patterns of the first and second directive antennas 22, 24, the radiation pattern of the non-directive antenna 20 is uniform and extends outwardly from the non-directive antenna in a manner that is symmetric about the non-directive antenna regardless of the angle departure therefrom as shown, for example, in FIG. 3C. As with the radiation patterns of the first and second directive antennas, however, the strength of the signals emitted by the non-directive antenna also diminish as the distance from the non-directive antenna increases.

Although not depicted in FIG. 2, a beacon 12 may also include a transmitter operatively connected to the first and second directive antennas 22, 24 and the non-directive antenna 20 so as to cause the first and second directive antennas and non-directive antenna to emit signals in a controlled manner. Additionally, the beacon of this example embodiment may include a switch to route the signals generated by the transmitter to a respective antenna from among the first and second directive antennas and the non-directive antenna. In an example embodiment, the beacon further includes a battery for providing power to the transmitter. In some embodiments, the beacon is conservative in terms of power consumption relative to a scanner utilized for radio frequency identification (RFID) such that a beacon can be operated for a lengthy period of time by the power provided by the battery without requiring recharging or replacement of the battery.

The mobile device 10 that receives signals from the beacons 12 can be embodied in a variety of different manners. For example, the mobile device may be embodied by a mobile telephone, a smart phone, a smart watch, a personal digital assistant (PDA), a personal navigation device (PND), a portable navigation device, a camera, a computer, and/or other device that can perform navigation-related functions, such as digital routing and map display. Regardless of the manner in which the mobile device is embodied, the mobile device generally includes or is otherwise associated with an apparatus 30 as shown in FIG. 4. In this regard, the apparatus includes, is associated with or in communication with processing circuitry 32, a memory device 34 and a communication interface 36.

In some embodiments of the processing circuitry 32, the processing circuitry may be in communication with the memory device 34 via a bus for passing information among components of the apparatus 30. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the navigation system to carry out various functions in accordance with an example embodiment. For example, the memory device could be configured to buffer input data for processing by the processing circuitry. Additionally or alternatively, the memory device could be configured to store instructions for execution by the processing circuitry.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, the computing device) configured to employ an embodiment by further configuration of the processor by instructions for performing the algorithms and/or operations described herein. The processing circuitry may include, among other things, a clock, an arithmetic logic unit (ALU) and logic gates configured to support operation of the processor.

The apparatus 30 of an example embodiment may also include a communication interface 36 that may be any means such as a device or circuitry embodied in either hardware or a combination of hardware and software that is configured to receive and/or transmit data to/from a communications device in communication with the apparatus, such as to facilitate communications, such as with one or more beacons 12. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Prior to utilizing the signals provided by the beacon 12 in order to determine the position of the mobile device 10, a parametric model is defined of the angle for the mobile device to the beacon. Based upon this parametric model, the position of the mobile device may thereafter be determined, at least in terms of the angle of the mobile device to the beacon and, in some embodiments, in terms of the position of the mobile device, either relative to the beacon or in absolute terms.

In an example embodiment, a system and method are provided for defining the parametric model. The system of this example includes one or more beacons 12, each of which includes at least first and second directive antennas 22, 24 and at least a non-directive antenna 20, a communication interface for receiving signals from the first and second directive antennas and the non-directive antenna and processing circuitry for defining the parametric model based upon the signals received from the beacon. The communication interface and processing circuitry of the system may be embodied in various manners including by a probe and the probe, in turn, may be embodied as a computing device, such as a mobile device 10 as described above. For purposes of example, however, a probe in the form of a mobile device that includes or is otherwise associated with or in communication with an apparatus 30 of the type shown in FIG. 4 will be referenced hereinafter with the communication interface 36 and processing circuitry 32 of the system for defining the parametric model being depicted in FIG. 4.

Referring now to FIG. 5, the operations performed to define a parametric model of the angle for the mobile device 10 to the beacon 12 are depicted. As shown in block 40 of FIG. 5, the system of an example embodiment for defining the parametric model includes means, such as the communication interface 36, the processing circuitry 32 or the like, for receiving signals from at least the first and second directive antennas 22, 24 and at least the non-directive antenna 20 at each of a plurality of angular positions throughout a range of angles. In an example embodiment in which the beacons are configured to communicate in accordance with Bluetooth communications, the beacons may be configured to issue Bluetooth Generic Access Profile (GAP) broadcasts on the same Bluetooth frequency channel from the first and second directive antennas and at least the non-directive antenna in order to advertise their existence. In this embodiment, the system, such as the communication interface, may be configured to perform a Bluetooth scan in order to receive the signals transmitted by the beacons. Although the signals may be received from the first and second directive antennas and the non-directive antennas throughout various ranges of angles, signals are received in one embodiment from the first and second directive antennas and from the non-directive antenna at a plurality of angular positions throughout a range of at least 180 degrees and, in some embodiments, at least 360 degrees.

In an embodiment depicted in FIG. 6A in which the radiation pattern of the first directive antenna 22 is depicted, signals are received from the first directive antenna at a plurality of angular positions throughout a range of 180 degrees. In this example embodiment, the 180 degree range begins and ends at the axis defined by the first directive antenna that extends through the first and second elements of the two element array antenna of the first directive antenna.

The signals that are received from a respective antenna of the beacon 12 at each of the plurality of angular positions throughout the range of angles are generally received at the same predefined distance from the central axis, such as by a probe that is located the predefined distance from the central axis and that moves through the range of angles while receiving signals transmitted by the respective antenna. In the example embodiment of FIG. 6A, a probe receives signals from the first directive antenna along both a near probe path 60 spaced by a first distance from the central axis and also along a far probe path 62 spaced by a second distance, greater than the first distance, from the central axis. As used herein, near and far in terms of the probe paths are relative terms. The signals received by the communication interface 36 and/or the processing circuitry 32, such as by the probe, may be stored, such as by the memory device 34.

As noted above, the strength of the signals emitted by the first directive antenna 22 decreases as the distance from the first directive antenna increases. In this regard, the signal strength of the signals received from the first directive antenna along the near probe path 60 and along the far probe path 62 are depicted in FIGS. 6B and 6C, respectively. The signal strength may be represented in various manners, but in one example embodiment, is represented as the received signal strength indication (RSSI) of the signals that are received. As shown by FIGS. 6B and 6C, the signal strength along both the near and far probe paths exhibits a similar angular dependency, such as an identical angular dependency, but the signal strength is significantly less along the far probe path than along the near probe path.

FIG. 7A depicts the reception of signals from the second directive antenna 24 along a near probe path 60 and along a far probe path 62 through the same range of angles, such as through a range of 180 degrees that begins and ends on the axis that extends through the first and second elements of the two element array antenna of the first directive antenna 22. FIGS. 7B and 7C provide graphical representations of the signal strength as a function of the angle at which the signals from the second directive antenna were received. The graphical representations of FIGS. 7B and 7C have the same shape and size as the graphical representations of FIGS. 6B and 6C, respectively, but are shifted by the same predefined angular offset that exists between the first and second directive antennas, that is, by 45 degrees in the illustrated embodiment.

FIG. 8A depicts the reception of signals from the non-directive antenna 20 along a near probe path 60 and along a far probe path 62 through the same range of angles, such as through a range of 180 degrees that begins and ends on the axis that extends through the first and second elements of the two element array antenna of the first directive antenna 22. As a result of the uniform radiation pattern provided by the non-directive antenna, the signal strength of the signals received along either probe path does not exhibit an angular dependency and, instead, the signals received at any angle along a respective probe path are of equal value. In this regard, the strength of the signals received throughout the range of angles along the near probe path and along the far probe path are depicted in FIGS. 8B and 8C, respectively. As FIGS. 8B and 8C illustrate, there is no angular dependence, but the signal strength varies between the near and far probe paths, such as by being reduced as the distance from the non-directive antenna increases.

In an example embodiment, the beacon 12 sequentially transmits the signals from each of the antennas, such as by first transmitting the signals from the first directive antenna 22, then transmitting the signals from the second directive antenna 24 and finally transmitting the signals from the non-directive antenna 20. Correspondingly, the system, such as the communication interface 36 and/or the processing circuitry 32, of this example embodiment is configured to sequentially receive the signals from each of the antennas of the beacon, such as by first receiving the signals from the first directive antenna, then receiving the signals from the second directive antenna and finally receiving the signals from the non-directive antenna. In order to reduce the risk of changes in the environment that may alter the strength of the signals received by the communication interface 36, the beacon of an example embodiment sequentially transmits the signals from each of the antennas with a small gap, such as a gap of less than about 10 milliseconds, between the signals transmitted from one antenna and the signals transmitted from the next antenna.

Although an example of the sequential transmission and reception is provided herein, the particular order is provided by way of example and not of limitation as the signals from the different antennas of the beacon 12 may be transmitted in other sequential orders in other embodiments. Thus, in an example embodiment, the beacon is also configured to transmit and system, such as the communication interface 36 and/or the processing circuitry 32, is correspondingly configured to receive an antenna identifier in association with the signals. See block 42 of FIG. 5. The antenna identifier identifies the respective antenna of the beacon that is transmitting the signals that are associated therewith. As such, the system of this example embodiment also includes means, such as the processor circuitry or the like, for identifying whether the signals that are received from the first directive antenna 22, the second directive antenna 24 or the non-directive antenna 20 based upon the antenna identifier associated with the signals.

Additionally or alternatively, the beacon 12 of an example embodiment may be configured to transmit an address in association with the signals. A different address may be transmitted depending upon whether the signals are transmitted by the first directive antenna 22, the second directive antenna 24 or the non-directive antenna 20. For example, a first address may be transmitted in conjunction with signals transmitted by the first directive antenna, a second address, different that the first address, may be transmitted along with signals transmitted from the second directive antenna and a third address, different than the first and second addresses, may be transmitted in association with the signals transmitted by the non-directive antenna. As such, the system of this example embodiment includes means, such as the communication interface 36, the processing circuitry 32 or the like, for receiving an address in association with the signals and means, such as the processing circuitry, the memory device 34 or the like, for causing signals to be stored in different memory locations based upon the address associated with the signals. See blocks 44 and 46 of FIG. 5. In this regard, the system, such as the processing circuitry and/or the memory device, is configured to store the signals that are received by the communication interface in a memory location that is dependent upon the address associated with the signals. By associating a different address with the signals depending upon the antenna that transmits the signals, the signals that are received are stored in different memory locations, thereby avoiding an instance in which subsequently received signals overwrite previously received signals transmitted by a different antenna.

As shown in block 48 of FIG. 5, the system of an example embodiment also includes means, such as the processing circuitry 32 or the like, for normalizing the signal strength of the signals received from the first and second directive antennas 22, 24 based on the signal strength of the signals received from the non-directive antenna 20, thereby defining normalized signal strengths of the signals received from the first and second directive antennas. In an example embodiment, the system, such as the processing circuitry, is configured to normalize the signal strength of the signals received from the first directive antenna by determining a ratio of the signal strength to the signals received from the first directive antenna to the signal strength of the signals received from the non-directive antenna, thereby determining the normalized signal strength of the signals received from the first directive antenna. Similarly, the system, such as the processing circuitry, of this example embodiment is configured to normalize the signal strength of the signals received from the second directive antenna by determining a ratio of the signal strength to the signals received from the second directive antenna to the signal strength of the signals received from the non-directive antenna, thereby determining the normalized signal strength of the signals received from the second directive antenna.

By way of example, FIG. 9A depicts the signal strength of signals received from the second directive antenna 24 along the near probe path 60 as a function of the angle at which the signals were captured as illustrated by graphical representation 70 being divided by the signal strength of the signals received from the non-directive antenna along the near probe path as a function of the angle at which the signals were captured as illustrated by graphical representation 72 so as to produce the normalized signal strength of the signals received from the second directive antenna as a function of the angle at which the signals were captured as illustrated by graphical representation 76. Similarly, FIG. 9B depicts the signal strength of signals received from the second directive antenna along the far probe path 62 as a function of the angle at which the signals were captured as illustrated by graphical representation 76 being divided by the signal strength of the signals received from the non-directive antenna along the far probe path as a function of the angle at which the signals were captured as illustrated by graphical representation 78 so as to produce the normalized signal strength of the signals received from the second directive antenna as a function of the angle at which the signals were captured as illustrated by graphical representation 80.

As shown in the graphical representation 74 of FIG. 9A and the graphical representation 80 of FIG. 9B, the resulting normalized signal strength of signals received from the second directive antenna 24 is identical for both the signals captured along the near probe path 60 and the far probe path 62. Thus, the normalized signal strength of signals received from the second directive antenna does not depend upon the attenuation of the signals as a function of the distance at which the signals are received from the second directive antenna. The normalized signal strength is therefore independent of attenuation and independent of distance from the second directive antenna (and/or objects disposed between the beacon 12 and the probe that serve to attenuate the signals) and, instead, depends only upon the angle at which the signals are received. Although not illustrated, the normalized signal strength of signals received from the first directive antenna is similarly independent of attenuation and distance from the first directive antenna and, instead, only depends upon the angle at which the signals are received.

The elimination of the dependence upon attenuation is attributable to the ratio of the signal strength of the signals received from one of the directive antennas to the signal strength of the signals received from the non-directive antenna 20. Since the signal strengths of the signals received from each of the antennas are similarly dependent upon attenuation as a function of distance from the central axis, this reliance upon attenuation is eliminated, e.g., cancelled out, during the formation and evaluation of the ratio. In this regard, the normalized signal strength (also termed the directivity factor (DF)) of the signals received from the first and second directive antennas 22, 24 (also termed the X and Y channels, respectively) may be defined as follows:

$$DFx = Pxatt/Pratt$$

$$DFy = Pyatt/Pratt$$

wherein:
DFx is the directivity factor for X channel;
DFy is the directivity factor for Y channel;
Pxatt is the signal strength received on the X channel at a specific angle;
Pyatt is the signal strength received on the Y channel at a specific angle; and
Pratt is the signal strength received from the non-directive antenna (also termed the Ref channel) at a specific angle.

The signal strength that is received from a respective antenna may be represented as a function of non-attenuated signal strength transmitted by the respective antenna and an attenuation factor, such as attributable to distance and/or an obstruction, Pxatt, Pyatt and Pratt may be re-written as follows:

$$Pxatt = Px0 * attenuation$$

$$Pyatt = Py0 * attenuation$$

$$Pratt = Pr0 * attenuation$$

wherein:
Px0 is the non attenuated signal strength transmitted on the X channel at a specific angle (thereby defining the power at the surface of the first directive antenna 22);
Py0 is the non attenuated signal strength transmitted on the Y channel at a specific angle (thereby defining the power at the surface of the second directive antenna 24); and
Pr0 is the non attenuated signal strength transmitted on the Ref channel at a specific angle (thereby defining the power at the surface of the non-directive antenna 20).

The directivity factor equations may then be reformulated as follows:

$$DFx = (Px0 * attenuation)/(Pr0 * attenuation)$$

$$DFx = Px0/Pr0$$

$$DFy = (Py0 * attenuation)/(Pr0 * attenuation)$$

$$DFy = Py0/Pr0$$

As illustrated by DFx and DFy, the normalized signal strength for the signals received from the first and second directive antennas 22, 24 is not dependent upon the attenuation factor and, instead, is a ratio of the signal strength of the signals received from one of the first and second directive antennas to the signal strength of the signals received from the non-directive antenna 20 at various angles throughout the range of angles.

As shown in block 50 of FIG. 5, the system of this example embodiment also includes means, such as the processing circuitry 32 or the like, for defining the parametric model representative of relationships based upon the normalized signal strength of the signals received from the first and second directive antennas 22, 24 to the angle of the mobile device 10 to the beacon 12, as represented by the angle at which the signals from the respective antenna were captured. In this regard, FIGS. 10A and 10B depict the normalized signal strengths of the signals received from the first and second directive antennas, respectively, and FIG. 10C depicts the resulting parametric model 82 that is defined thereby. Although the parametric model may be defined differently in various embodiments, the parametric model of FIG. 10C is defined as a function of the angle of a mobile device to the beacon with the square root of the normalized signal strength for signals received from the first directive antenna plotted along the x axis and the square root of the normalized signal strength for the signals received from the second directive antenna plotted along the y axis. The parametric model defines the angle of the mobile device to the beacon based upon the square root of the normalized signal strengths in the illustrated embodiment since the signal strength of the signals received from the first and second directive antennas is related to the square of the root mean square (RMS) value of the transmitted signals, e.g., the Bluetooth signals and further since the resulting parametric curve is no longer circular, but becomes distorted if the normalized signal strengths, as opposed to the square root of the normalized signal strengths, were utilized. The parametric model is therefore defined based upon the signal strength of signals captured, such as by a probe, at a plurality of known angles relative to the respective antenna that is generating the signals.

In relation to a circular parametric curve such as shown in FIG. 10C, the orientation angle is the Cartesian angle from the center of the circular parametric curve to a point on the circumference of the curve, which resulted from plotting the parametric equation of the square root of the normalized signal strength of the first and second directive antennas 22, 24 as a function of the angle of departure, that is, the probe angle at which the signals from the first and second directive antennas were captured. With reference to FIG. 10C, starting from an orientation angle of 0 degrees and going fully around the circular parametric curve to an orientation angle of 360 degrees, the angle of departure correspondingly goes from 0 degrees to 180 degrees. Thus, the angle of departure is equal to one half the orientation angle. Furthermore, if the angle of departure continues to be rotated beyond 180 degrees, the orientation angle repeat a second circle around the center of the circular parametric curve, thereby leading to ambiguity as to whether the calculated angle of departure is the angle of departure determined during the first rotation about the circular parametric curve or is 180 degrees offset therefrom as determined during the second rotation about the circular parametric curve. As described below with respect to FIG. 12, analysis of signals from two or more beacons 12 can resolve this ambiguity.

Once the parametric models has been defined, the parametric model may then be utilized to determine the angle of a mobile device 10 that receives signals from the antennas of a beacon 12 but that is located at an unknown angle relative thereto. In this regard, a positioning system is provided that includes or is otherwise in association with or in communication with the apparatus 30 of FIG. 4. The positioning system including, for example, the apparatus may be embodied by the mobile device 10 or may be associated with or in communication with the mobile device that receives the signals from the antennas of the beacon.

As shown in block 90 of FIG. 11, the positioning system includes means, such as the communication interface 36, the processing circuitry 32 or the like, for receiving signals transmitted from a beacon 12 by at least first and second directive antennas 22, 24 and at least one non-directive antenna 20. In this regard, the mobile device 10 may be configured to receive signals transmitted from the beacon and to then determine a position of the mobile device, at least relative to the beacon, based upon those signals. As such, the positioning system is not dependent upon cellular communication, but, instead, utilizes wireless communication with one or more beacons such that the positioning system is capable of determining the position of the mobile device in various settings, such as in instances in which the mobile device is within a building or is otherwise indoors. In an example embodiment in which the beacon is configured to communicate in accordance with Bluetooth communications, the beacon may be configured to issue Bluetooth GAP broadcasts on the same Bluetooth frequency channel from the first and second directive antennas and at least the non-directive antenna in order to advertise its existence. In this embodiment, the positioning system, such as the communication interface, may be configured to perform a Bluetooth scan in order to receive the signals transmitted by the beacons.

In an example embodiment, the positioning system includes means, such as the communications interface 36, the processing circuitry 32 or the like, for sequentially receiving signals transmitted from the beacon 12 by the first directive antenna 22, signals transmitted from the beacon by the second directive antenna 24 and signals transmitted from the beacon by the non-directive antenna 20. In one embodiment, for example, the communication interface is configured to first receive signals transmitted from the beacon by the first directive antenna, then by the second directive antenna and finally from the non-directive antenna. As noted above, however, the signals may be transmitted from the antennas of the beacon in different sequential orders in other embodiments. Thus, the positioning system of this example embodiment may also include means, such as the communication interface, the processing circuitry or the like, for receiving an antenna identifier associated with the signals received from a respective antenna of the beacon. See block 92 of FIG. 11. In this regard, the antenna identifier is configured to identify the respective antenna of the beacon that is transmitting the signals with which the antenna identifier is associated. In this example embodiment, the positioning system includes means, such as the processing circuitry or the like for identifying whether the signals are received from the first directive antenna, the second directive antenna or the non-directive antenna based upon the antenna identifier associated with the signals. See block 94 of FIG. 11. Thus, even though the signals may be transmitted from the various antennas of the beacon in different sequential orders, the positioning system, such as the processing circuitry, is configured to determine the respective antennas from which the signals were transmitted.

In an example embodiment, the positioning system of an example embodiment also includes means, such as the communications interface 36, the processing circuitry 32 or the like, for receiving an address associated with each of the signals transmitted from the beacon 12 with the address being different depending upon the antenna that transmits the signals. See block 96 of FIG. 11. Thus, different addresses are associated with the signals transmitted by the first directive antenna 22 of the beacon, the signals transmitted by the second directive antenna 24 of the beacon and the signals transmitted by the non-directive antenna 20 of the beacon. In this regard, a first address may be associated with the signals transmitted from the beacon by the first directive antenna, a second address, different than the first address, may be associated with the signals transmitted by the second directive antenna and a third address, different than the first and second addresses, may be associated with the signals transmitted by the non-directive antenna.

Based upon the address associated with the signals that are received, the positioning system includes means, such as the processing circuitry 32, the memory 34 or the like, for causing the signals transmitted by each of the first directive antenna 22, the second directive antenna 24 and the non-directive antenna 20 to be stored in different memory locations since the memory location in which the signals are stored is dependent upon the address associated with the respective signals. See block 98 of FIG. 11. As such, the positioning system, such as the processing circuitry, of this example embodiment prevents signals that are sequentially transmitted by the first directive antenna, the second directive antenna and the non-directive antenna from being stored to the same memory location and overwriting one another. Instead, by associating different addresses with the signals that are received depending upon the respective antenna that transmits the corresponding signals, the signals may be stored in different memory locations.

As shown in block 100 of FIG. 11, the positioning system of an example embodiment includes means, such as the processing circuitry 32 or the like, for determining the signal strength of the signals received from the at least the first and second directive antennas 22, 24 of the beacon 12 and at least a non-directive antenna 20 of the beacon. Although the signal strength may be defined in various manners, the signal strength is defined in accordance with an example embodiment as the RSSI of the signals that are received. As shown in block 102 of FIG. 11, the positioning system of this example embodiment also includes means, such as the processing circuitry or the like, for normalizing the signal strengths of the signals received from the first and second directive antennas based on the signal strength of the signals received from the non-directive antenna, thereby defining normalized signals strengths of the signals received from the first and second directive antennas. As described above, the positioning system, such as the processing circuitry, is configured in accordance with an example embodiment to normalize the signal strength of the signals received from the first directive antenna by determining a ratio of the signal strength of the signals from the first directive antenna to the signal strength of the signals received from the non-directive antenna. Thus, the normalized signal strength of the signals received from the first directive antenna is defined. Similarly, the positioning system, such as the processing circuitry, of this example embodiment is configured to determine a ratio of the signal strength of the signals received from the second directive antenna to the signal strength of the signals received from the non-directive antenna, thereby determining the normalized signal strength of the signals received from the second directive antenna. As described above, the determination of the normalized signal strengths of the signals from the first and second directive antennas eliminates the dependence of the signal strength upon attenuation and upon the distance from the beacon with the normalized signal strengths only depending upon the angle from the beacon to the mobile device 10.

As shown in block 104 of FIG. 11, the positioning system also includes means, such as the processing circuitry 32 or the like, for determining an angle at which the signals from the beacon 12 propagate based upon the normalized signal strengths. In this regard, the positioning system, such as the processing circuitry, is configured to determine the angle from a parametric model 82, such as that shown in FIG. 10C, representative of relationships based upon the normalized signal strengths of the signals received in the first and second directive antennas 22, 24 to the angle. Although the parametric model may be defined in various manners, the angle may be defined by the parametric model of FIG. 10C by identifying the point on the circle (that graphically represents the parametric model) that has x and y coordinates that correspond to the normalized signal strengths of the signals received from the first and second directive antennas. The point on the circle representing the parametric model is associated with a corresponding angle as shown in FIG. 10C with the angle being the angle to the mobile device 10.

With reference to FIG. 10C, for example, in an instance in which the normalized signal strengths of the signals received from the first and second directive antennas 22, 24 have an intermediate value and a value of 0, respectively, the parametric model 82 defines an angle of 45 degrees. As another example, in an instance in which the normalized signal strengths of the signals received from the first and second directive antennas have a value of 0 and an intermediate value, respectively, the parametric model defines an angle of 0 degrees. As further example, in an instance in which the normalized signal strengths of the signals received from the first and second directive antennas have a maximum value and an intermediate value, respectively, the parametric model defines an angle of 90 degrees, while in an instance in which the normalized signal strengths of the signals received from the first and second directive antennas have an intermediate value and a maximum value, respectively, the parametric model defines an angle of 135 degrees.

As shown in FIG. 12 with reference to Beacon A, the determination of the angle 110 at which the signals from the beacon 12 propagate defines a reference line 114 that extends at the angle from the beacon. In this regard, the angle is defined between the reference line and the axis extending between the first and second elements of the two element antenna array of the first directive antenna 22 (which defines the 0 degree reference position) as described above in conjunction with FIGS. 6A, 7A and 8A. Based upon the signals received from a single beacon and the determination of the angle, a reference line is defined, but the location of the mobile device 10 along the reference line remains ambiguous. However, in an example embodiment, the positioning system is configured to repeat the same process as described above in conjunction with FIG. 11 in order to determine the angle 112 at which signals from another beacon, e.g., Beacon B in FIG. 12, propagate. Based upon the angle at which signals from the other beacon propagate, a second reference line may be defined as shown in FIG. 12. In this example embodiment, the positioning system includes means, such as the processing circuitry or the like, for determining the position of the mobile device based upon the intersection the reference lines extending from the beacons at their respective angles. See block 106 of FIG. 11. This process may be repeated based upon signals received from additional beacons in order to refine the position of the mobile device, particularly in an instance in which two or more of the beacons lie along or near the same reference line.

By defining the position of the mobile device 10 based upon the parametric model as described above, the positioning system, method and computer program product of an example embodiment are configured to determine the position of the mobile device in an accurate and stable manner, even in instances in which the mobile device is within a building or otherwise unable to communicate with a cellular network. By utilizing signals transmitted by beacons 12 in order to determine the position of the mobile device, the positioning system, method and computer program product of an example embodiment limit the communication infrastructure that is required and permit extended operation as a result of limited power consumed by the one or more beacons. The positioning system, method and computer program product of an example embodiment are also configured to be immune to signal attenuation attributable to the distance between the mobile device and the one or more beacons and/or to objects through which the signals must pass between the one or beacons and the mobile device.

FIGS. 5 and 11 illustrate flowcharts of a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus 30 employing an embodiment of the present invention and executed by processing circuitry 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A positioning system comprising processing circuitry and at least one memory including computer program code, the at least one memory and computer program code configured to, with the processing circuitry, cause the positioning system to at least:
    determine a signal strength of signals received from at least first and second directive antennas of a beacon and at least a non-directive antenna of the beacon, wherein each of the first and second directive antennas are two-element array antennas, the first and second directive antennas angularly offset from one another by a predetermined angle, wherein each of the first and second directive antennas and the non-directive antenna transmit a packet identifying a signal address and identification of the antenna transmitting the respective packet;
    normalize the signal strength of the signals received from the first and second directive antennas based on the signal strength of the signals received from the non-directive antenna to determine normalized signal strengths of the signals received from the first and second directive antennas;
    plot the normalized signal strength of signal received from the first directive antenna versus probe angle around the beacon on a first plot;
    plot the normalized signal strength of signal received from the second directive antenna versus probe angle around the beacon on a second plot;
    match a normalized signal strength of the first directive antenna received at a mobile device to a point on a curve of the first plot;
    match a normalized signal strength of the second directive antenna received at the mobile device to a point on a curve of the second plot; and
    determine an angle of departure from the beacon at which the mobile device is located based upon the matched point on the curve of the first plot and the matched point on the curve of the second plot.

2. A positioning system according to claim 1 wherein the at least one memory and computer program code are configured to, with the processing circuitry, cause the positioning system to normalize the signal strength of the signals received from the first and second directive antennas by determining a ratio of the signal strength of the signals received from the first directive antenna to the signal strength of the signals received from the non-directive antenna to determine the normalized signal strength of the signals received from the first directive antenna, and determining a ratio of the signal strength of the signals received from the second directive antenna to the signal strength of the signals received from the non-directive antenna to determine the normalized signal strength of the signals received from the second directive antenna.

3. A positioning system according to claim 1 wherein the at least one memory and computer program code are further configured to, with the processing circuitry, cause the positioning system to identify whether the signals are received from the first directive antenna, the second directive antenna or the non-directive antenna based upon an antenna identifier associated with the signals.

4. A positioning system according to claim 1 wherein the at least one memory and computer program code are configured to, with the processing circuitry, cause the positioning system to determine the angle by determining the angle of departure from a parametric model representative of relationships based upon the normalized signal strengths of the signals received from the first and second directive antennas to the angle of departure.

5. A positioning system according to claim 1 further comprising a communication interface configured to sequentially receive signals transmitted from the beacon by the first directive antenna, signals transmitted from the beacon by the second directive antenna and signals transmitted from the beacon by the non-directive antenna.

6. A positioning system according to claim 5 wherein the communication interface is configured to receive a different address associated with each of the signals transmitted from the beacon by the first directive antenna, the signals transmitted from the beacon by the second directive antenna and the signals transmitted from the beacon by the non-directive antenna.

7. A positioning system according to claim 5 wherein the communication interface is embodied by the mobile device, and wherein the at least one memory and computer program code are further configured to, with the processing circuitry, cause the positioning system to determine a position of the mobile device by determining an angle of departure at which signals from another beacon propagate and determining the position of the mobile device based upon an intersection of reference lines extending from the beacons at the respective angles of departure.

8. The positioning system of claim 1, wherein the first directive antenna, the second directive antenna, and the non-directive antenna are configured in a cylindrical-centric orientation.

9. The positioning system of claim 8, wherein the first directive antenna is configured parallel to the non-directive antenna at a surface of the cylinder at opposite ends of a diameter of the cylinder, wherein the second directive antenna is configured parallel to the non-directive antenna at a surface of the cylinder at opposite ends of a diameter of the cylinder, offset by the predetermined angle from the first directive antenna.

10. The positioning system of claim 8, wherein the predetermined angle is forty-five degrees.

11. The positioning system of claim 1, wherein the packet from each of the first and second directive antennas and the non-directive antenna are transmitted on the same frequency channel.

12. A method comprising:
determining a signal strength of signals received from at least first and second directive antennas of a beacon and at least a non-directive antenna of the beacon, wherein each of the first and second directive antennas are two-element array antennas, the first and second directive antennas angularly offset from one another by a predetermined angle, wherein each of the first and second directive antennas and the non-directive antenna transmit a packet identifying a signal address and identification of the antenna transmitting the respective packet;
normalizing the signal strength of the signals received from the first and second directive antennas based on the signal strength of the signals received from the non-directive antenna to determine normalized signal strengths of the signals received from the first and second directive antennas;
plotting the normalized signal strength of signal received from the first directive antenna versus probe angle around the beacon on a first plot;
plotting the normalized signal strength of signal received from the second directive antenna versus probe angle around the beacon on a second plot;
matching a normalized signal strength of the first directive antenna received at a mobile device to a point on a curve of the first plot;
matching a normalized signal strength of the second directive antenna received at the mobile device to a point on a curve of the second plot; and
determining an angle of departure from the beacon at which the mobile device is located based upon the matched point on the curve of the first plot and the matched point on the curve of the second plot.

13. A method according to claim 12 wherein normalizing the signal strength of the signals received from the first and second directive antennas comprises determining a ratio of the signal strength of the signals received from the first directive antenna to the signal strength of the signals received from the non-directive antenna to determine the normalized signal strength of the signals received from the first directive antenna, and determining a ratio of the signal strength of the signals received from the second directive antenna to the signal strength of the signals received from the non-directive antenna to determine the normalized signal strength of the signals received from the second directive antenna.

14. A method according to claim 12 further comprising identifying whether the signals are received from the first directive antenna, the second directive antenna or the non-directive antenna based upon an antenna identifier associated with the signals.

15. A method according to claim 12 wherein determining the angle of departure comprises determining the angle from a parametric model representative of relationships based upon the normalized signal strengths of the signals received from the first and second directive antennas to the angle of departure.

16. A method according to claim 12 further comprising sequentially receiving signals transmitted from the beacon by the first directive antenna, signals transmitted from the beacon by the second directive antenna and signals transmitted from the beacon by the non-directive antenna.

17. A method according to claim 16 further comprising receiving a different address associated with each of the signals transmitted from the beacon by the first directive antenna, the signals transmitted from the beacon by the second directive antenna and the signals transmitted from the beacon by the non-directive antenna.

18. A method according to claim 16 wherein the signals are received by the mobile device, and wherein the method further comprises determining a position of the mobile device by determining an angle of departure at which signals from another beacon propagate and determining the position of the mobile device based upon an intersection of reference lines extending from the beacons at the respective angles of departure.

19. A computer program product comprising at least one non-transitory computer-readable storage medium having computer-executable program code portions stored therein, the computer-executable program code portions comprising program code instructions configured to:
- determine a signal strength of signals received from at least first and second directive antennas of a beacon and at least a non-directive antenna of the beacon, wherein each of the first and second directive antennas are two-element array antennas, the first and second directive antennas angularly offset from one another by a predetermined angle, wherein each of the first and second directive antennas and the non-directive antenna transmit a packet identifying a signal address and identification of the antenna transmitting the respective packet;
- normalize the signal strength of the signals received from the first and second directive antennas based on the signal strength of the signals received from the non-directive antenna to determine normalized signal strengths of the signals received from the first and second directive antennas;
- plot the normalized signal strength of signal received from the first directive antenna versus probe angle around the beacon on a first plot;
- plot the normalized signal strength of signal received from the second directive antenna versus probe angle around the beacon on a second plot;
- match a normalized signal strength of the first directive antenna received at a mobile device to a point on a curve of the first plot;
- match a normalized signal strength of the second directive antenna received at the mobile device to a point on a curve of the second plot; and
- determine an angle of departure from the beacon at which the mobile device is located based upon the matched point on the curve of the first plot and the matched point on the curve of the second plot.

20. A computer program product according to claim 19 wherein the program code instructions configured to normalize the signal strength of the signals received from the first and second directive antennas comprise program code instructions configured to determine a ratio of the signal strength of the signals received from the first directive antenna to the signal strength of the signals received from the non-directive antenna to determine the normalized signal strength of the signals received from the first directive antenna, and program code instructions configured to determine a ratio of the signal strength of the signals received from the second directive antenna to the signal strength of the signals received from the non-directive antenna to determine the normalized signal strength of the signals received from the second directive antenna.

21. A computer program product according to claim 19 wherein the computer-executable program code portions further comprise program code instructions configured to identify whether the signals are received from the first directive antenna, the second directive antenna or the non-directive antenna based upon an antenna identifier associated with the signals.

22. A computer program product according to claim 19 wherein the program code instructions configured to determine the angle comprise program code instructions configured to determine the angle of departure from a parametric model representative of relationships based upon the normalized signal strengths of the signals received from the first and second directive antennas to the angle of departure.

23. A computer program product according to claim 19 wherein the computer-executable program code portions further comprise program code instructions configured to cause signals transmitted from the beacon by the first directive antenna, signals transmitted from the beacon by the second directive antenna and signals transmitted from the beacon by the non-directive antenna to be stored in different memory locations based upon a different address associated with each of the signals transmitted from the beacon by the first directive antenna, the signals transmitted from the beacon by the second directive antenna and the signals transmitted from the beacon by the non-directive antenna.

24. A computer program product according to claim 23 wherein the signals are received by the mobile device, and wherein the computer-executable program code portions further comprise program code instructions configured to determine a position of the mobile device by determining an angle of departure at which signals from another beacon propagate and determining the position of the mobile device based upon an intersection of reference lines extending from the beacons at the respective angles of departure.

* * * * *